United States Patent
Bouvet

(10) Patent No.: US 10,863,342 B2
(45) Date of Patent: Dec. 8, 2020

(54) METHOD AND DEVICE FOR PROCESSING A SIGNALING MESSAGE RELATED TO A COMMUNICATION SERVICE OF A CLIENT DEVICE

(71) Applicant: Orange, Paris (FR)

(72) Inventor: Bertrand Bouvet, Perros Guirec (FR)

(73) Assignee: ORANGE, Paris (FR)

(*) Notice: Subject to any disclaimer, the term of this patent is extended or adjusted under 35 U.S.C. 154(b) by 180 days.

(21) Appl. No.: 15/576,544

(22) PCT Filed: May 12, 2016

(86) PCT No.: PCT/FR2016/051129
§ 371 (c)(1),
(2) Date: Nov. 22, 2017

(87) PCT Pub. No.: WO2016/189218
PCT Pub. Date: Dec. 1, 2016

(65) Prior Publication Data
US 2018/0160290 A1  Jun. 7, 2018

(30) Foreign Application Priority Data

May 22, 2015 (FR) ..................... 15 54631

(51) Int. Cl.
*H04W 8/08* (2009.01)
*H04L 29/06* (2006.01)
(Continued)

(52) U.S. Cl.
CPC ........... *H04W 8/082* (2013.01); *H04L 45/745* (2013.01); *H04L 65/1016* (2013.01);
(Continued)

(58) Field of Classification Search
CPC .... H04W 8/082; H04W 60/04; H04L 45/745; H04L 65/1016; H04L 65/1073
See application file for complete search history.

(56) References Cited

U.S. PATENT DOCUMENTS

2004/0204095 A1* 10/2004 Cyr ..................... H04W 76/10
  455/560
2010/0046501 A1* 2/2010 Witzel .................... H04W 8/06
  370/352

FOREIGN PATENT DOCUMENTS

| WO | 2009087186 A1 | 7/2009 |
| WO | 2009117413 A2 | 9/2009 |
| WO | 2010055012 A2 | 5/2010 |

OTHER PUBLICATIONS

International Search Report dated Aug. 2, 2016 for corresponding International Application No. PCT/FR016/051129, filed May 12, 2016.
(Continued)

*Primary Examiner* — Ricky Q Ngo
*Assistant Examiner* — Stephen N Steiner
(74) *Attorney, Agent, or Firm* — David D. Brush; Westman, Champlin & Koehler, P.A.

(57) ABSTRACT

A device for processing a signaling message related to a communication service provided to a client device via a communication network. When the client device is connected via an access network operating in circuit mode, the device translates a first signaling message for the circuit mode into a second signaling message suitable for being carried over the access network operating in packet mode, and vice versa. When the client device is connected via the access network operating in packet mode, the processing device receives from the client device a third signaling message suitable for being carried over the access network operating in packet mode and sends the third signaling message to a server of the communication network subsystem, and vice versa, and replaces in the received third signaling message a source address, including an address of the client device, with an address of the processing device.

13 Claims, 5 Drawing Sheets

(51) Int. Cl.
*H04L 12/741* (2013.01)
*H04W 60/04* (2009.01)
*H04W 92/02* (2009.01)

(52) U.S. Cl.
CPC ......... *H04L 65/1073* (2013.01); *H04W 60/04* (2013.01); *H04L 65/105* (2013.01); *H04L 65/1006* (2013.01); *H04W 92/02* (2013.01)

(56) References Cited

OTHER PUBLICATIONS

3rd Generation Partnership Project; Technical Specification Group Services and System Aspects; IP Multimedia Subsystem (IMS) centralized services; Stage 2 (Release 12),3GPP Standard; 3GPP TS 23.292, 3rd Generation Partnership Project (3GPP), Mobile Competence Center. Dec. 19, 2014, pp. 1-120, XP050927229.
Written Opinion of the International Searching Authority dated Aug. 2, 2016 for corresponding International Application No. PCT/FR2016/051129, filed May 12, 2016.
Machine translation of and copy of European Office Action dated Sep. 8, 2020 for corresponding European Application No. 16727764.9.

\* cited by examiner

METHOD AND DEVICE FOR PROCESSING A SIGNALING MESSAGE RELATED TO A COMMUNICATION SERVICE OF A CLIENT DEVICE

CROSS-REFERENCE TO RELATED APPLICATIONS

This Application is a Section 371 National Stage Application of International Application No. PCT/FR2016/051129, filed May 12, 2016, the content of which is incorporated herein by reference in its entirety, and published as WO 2016/189218 on Dec. 1, 2016, not in English.

FIELD OF THE DISCLOSURE

The invention relates to the field of communication networks, and more particularly to the processing of signaling messages of client devices within a communication network.

BACKGROUND OF THE DISCLOSURE

Communication services are nowadays able to be provided to a client device via a communication network operating in packet mode (PS for Packet Switch in English) or via a communication network operating in circuit mode (CS for Circuit Switch in English), depending on the type by access of the client device to the communication network.

When the client device is connected to an access network of 4G type, for example LTE (Long Term Evolution in English) associated with an IMS (IP—Internet Protocol—Multimedia Subsystem in English) subsystem, that is to say a network core having an IMS network architecture, such as introduced by the standardization body 3GPP ('3$^{rd}$ Generation Partnership Project') for mobile networks, it is necessary for this client device to register with the IMS subsystem in order to benefit from communication services.

The IMS network architecture in particular enables the dynamic setup and control of multimedia sessions between two clients, and also the reservation of resources at the level of the network for accessing multimedia streams. By virtue of this architecture, network operators are able to conveniently implement a management policy, provide a predetermined quality of service, and calculate bills to be invoiced to clients. The IMS architecture currently makes it possible to access telephony, videophone, SMS (Short Message Service in English), presence and instant messaging services, and also manages the interaction with these services.

Such an IMS network architecture comprises in particular:

one or more registration servers, called 'S-CSCF' (Serving-Call Session Control Function) servers, able (among other functions) to manage the registration procedure for the devices connected to the network;

one or more interrogation servers, called 'I-CSCF' (Interrogating-Call Session Control Function) servers and also often combined physically with the servers of S-CSCF type in order to form servers that are denoted 'I/S-CSCF', which, upon registration of a client device, interrogate a subscriber server called 'HSS' (Home Subscriber Server) in order to be able to select an S-CSCF server possessing the features required to achieve the level of service for which the user has subscribed;

one or more HSS servers, each containing a client database. Each HSS server contains the 'profile' of a certain number of client devices on the network, this profile comprising their registration state, authentication and location data, and services subscribed to;

one or more proxy servers, denoted 'P-CSCF' (Proxy-Call Session Control Function) servers, used as an entity for connecting between the IMS subsystem and the access network used by the client devices, and that are therefore able to retransmit all of the signaling messages between the client devices, on the one hand, and the S-CSCF or I-CSCF servers, on the other hand. These signaling messages are in particular messages in accordance with the SIP protocol, such as defined by the IETF (Internet Engineering Task Force) in the document RFC 3261, which enables the setup, modification and termination of multimedia sessions in a network using the IP protocol.

The client device thus registers with such an IMS subsystem by sending a SIP message 'REGISTER', containing identification information, to a P-CSCF server, which relays this message to an I-CSCF server which, after verification with an HSS server, retransmits this registration message to the appropriate S-CSCF server so that the latter registers the client device.

When the client device is connected to the communication network via a 2G or 3G access network, the client device has to authenticate itself to an MSC (Mobile Switching Center in English) switching center of the circuit communication network in order to benefit from the communication services provided by such a network. An MSC switching center is a device of a circuit mobile communication network that manages, inter alia, the routing of calls and SMSs for client devices, and the interconnection with other communication networks. The MSC switching center also manages the setup of communications for these client devices, mobility, and is able to participate in the handover of the client devices when they change radio cells in the course of a communication (case of 'inter-MSC handover': handover between MSC switching centers).

In order to simplify the provision of communication services to a client device for a communication network operator, the standard 3GPP TS 23292 specifies a mechanism that enables an MSC switching center to register itself in an IMS subsystem on behalf of a client device connected to a 2G or 3G access network. Thus, even when the client device is connected to a network operating in circuit mode, the communication services are provided to the client device as far as the MSC switching center by the IMS communication network.

According to this mechanism, when an incoming call to the client device is received by an S-CSCF server of the IMS subsystem, the type of connection of the client device (also called RAT for Radio Access Type in English) is verified with an HSS database. When the client device is connected to a 4G access network, the call is routed to the client device via the 4G access network in packet mode. When the client device is connected to a 2G or 3G access network, the call is routed in packet mode to the MSC switching center, which is registered in the IMS subsystem on behalf of the client device. The MSC switching center then ensures the routing of the call in circuit mode to the client device. Such a mechanism makes it possible to centralize the communication services in a single PS domain, regardless of the access network via which the client device is connected. Such a mechanism avoids problems of desynchronization of the data of a communication service between the CS and PS domains. Furthermore, this mechanism makes it possible to limit cases of Circuit Fallback Switching (CSFB), in which the client device has to switch from a 4G connection to a 2G/3G connection, for example upon reception or transmission of a telephone call or of an SMS message.

However, according to this mechanism, the IMS subsystem then involves two registrations relating to one and the same client device: one registration relating to the client device connected to a 4G access network, and one registration relating to the registration of the MSC switching center on behalf of the client device. Such a mechanism is therefore not optimal from a communication network resources point of view, as it increases the number of signaling messages in relation to the client device and the complexity in processing the services to be provided to the client device.

The invention aims to improve the existing prior art.

SUMMARY

An exemplary embodiment of the present invention relates to a method for processing a signaling message relating to a communication service provided to a client device by the communication network. Advantageously, when the client device is connected to the communication network via an access network operating in packet mode, the method comprises:
- a step of receiving, from said client device or from a server of the communication network, a third signaling message designed to be routed via the access network operating in packet mode,
- a step of replacing, in the received third signaling message, a source address comprising an address of the client device with an address of the mobile switching center,
- a step of sending said modified third signaling message to the server of the communication network or to said client device.

The processing method according to the invention thus enables an evolved mobile switching center of the communication network to transmit the signaling messages relating to a client device to a proxy server of a subsystem of the communication network, such as a P-CSCF server of an IMS subsystem, when the client device is connected to the communication network via an access network operating in packet mode, such as a 4G access network. The management of the signaling messages relating to the client device is thus independent of the access network to which the client device is connected. By virtue of the invention, such messages transit systematically through the mobile switching center. From the point of view of the P-CSCF server, such a server no longer needs to determine the device (mobile switching center or client device) to which to send the signaling messages. The management of the communication network is thus simplified, regardless of the type of access network via which the client device accesses the communication network. Moreover, according to the invention, the signaling messages, for example a registration message or a communication request message, are transmitted on the initiative of the client device to the P-CSCF server of the IMS subsystem via the mobile switching center. The mobile switching center then knows how to distinguish whether the client device is connected to an access network operating in packet mode or in circuit mode.

Moreover, by virtue of the invention, the management of a situation of handing over the connection of a client device from an access network operating in packet mode to an access network operating in circuit mode is improved. Specifically, the invention proposes an alternative to the existing function, termed SRVCC (Single Radio Voice Call Continuity in English), defined by the 3GPP standard. Specifically, the association method enables an operator having only 4G coverage to overcome the requirement to keep a server providing SRVCC functionality. SRVCC functionality makes it possible to ensure continuity in a communication set up between two client devices or between a client device and a server when a client device switches from a 4G access network to a 2G/3G access network. If an operator chooses to unfurl only 4G access networks in a territory or to modify its access networks so as to provide only 4G access networks, such an operator then no longer needs to use an SRVCC functionality. However, in order to make it possible to continue to provide its communication services to its subscribers when they are in a roaming out situation, that is to say when the subscribers are connected to a communication network different from their nominal network, an operator has to negotiate roaming out agreements with other communication network operators. Now, the operator does not control the technology unfurled on the communication networks of the other operators with which they have negotiated agreements. Thus, when a client device that subscribes to the operator in question is in a roaming out situation and when it switches from a 4G access network to a 2G/3G access network in the course of a communication, depending on the interconnection model of the nominal and visited communication networks, SRVCC functionality is generally ensured by the nominal network of the subscriber.

The operator of the nominal network of the subscriber then has to keep a server designed to provide this SRVCC function in order to manage cases of 4G to 3G/2G handover, or vice versa, of its subscribers when they are in a roaming out situation, even when such an operator has chosen to unfurl only 4G access networks on its communication network.

The method according to the invention thus makes it possible to overcome this constraint by proposing an alternative to SRVCC functionality. The method according to the invention enables, when a client device is in a roaming out situation, the visited network to be the one that ensures the handover of the client device from a 4G access network to a 2G/3G access network when the client device is in the course of communication.

Correspondingly, the invention relates to a device for processing a signaling message relating to a communication service provided to a client device by a communication network. When the client device is connected to the communication network via an access network operating in circuit mode, said device is designed to translate a first signaling message, designed to be routed via the access network operating in circuit mode, into a second signaling message designed to be routed via the access network operating in packet mode, and vice versa. When the client device is connected to the communication network via the access network operating in packet mode, the processing device comprises:
- a communication module able to receive, from said client device, a third signaling message designed to be routed via the access network operating in packet mode, and to send said third signaling message to a server of the subsystem of the communication network, and vice versa,
- a processing module able to replace, in said received third signaling message, a source or recipient address comprising an address of the client device with an address of the processing device, or vice versa.

According to the invention, such a processing device is for example a mobile switching center of the communication network. Such a switching center then performs the role of a gateway between the proxy server of the subsystem of the communication network, such as a P-CSCF server of an IMS subsystem, and the client device, such as a terminal. Thus, according to the invention, the processing device provides the role of a proxy for the signaling messages transmitted and received by the client device via the communication network when the client device is connected to the communication network via an access network operating in packet mode, such as a 4G access network.

The invention thus makes it possible to simplify the IMS subsystem, since just one registration of the client device is necessary, rather than two registrations in the prior art.

The various embodiments or features mentioned hereinafter may be added, independently or in combination with one another, to the features of the device defined above.

According to one particular embodiment of the invention, the communication module is designed to receive and to transmit a media data stream relating to a communication set up between said client device and another client device, and the processing module is designed to replace:
- in a source address field of the media data stream, the address of the client device with the address of the processing device when the media data stream is received from the client device and destined for the other client device,
- in a recipient address field of the media data stream, the address of the processing device with the address of the client device when the media data stream is received from the other client device and destined for the client device.

According to this particular embodiment of the invention, the processing device is also designed to relay the media data streams from a communication set up between the client device and another client device. Thus, upon a situation of handing over the client device from an access network operating in packet mode to an access network operating in circuit mode, or vice versa, the handover is implemented more quickly, since the streams to be handed over from the packet network to the circuit network are already anchored at the mobile switching center.

According to another particular embodiment of the invention, the processing device furthermore comprises a memory storing an address of the proxy server of a subsystem of the communication network.

According to another particular embodiment of the invention, the processing device is included in an evolved mobile switching center.

The invention also relates to a method for sending a signaling message relating to a communication service provided to a client device by a communication network, said signaling message being designed to be routed via an access network operating in packet mode, and said signaling message being destined for a proxy server of a subsystem of the communication network, the method comprising:
- during a phase of associating the client device with said access network operating in packet mode in order to access said communication network, a step of acquiring an address of a mobile switching center of the communication network, from an access network mobility management device,
- after the phase of associating the client device with said access network, a step of sending the signaling message to said mobile switching center.

Advantageously, the client device acquires the address of a mobile switching center to which the client device has to transmit its signaling messages following the phase of associating the client device with an access network operating in packet mode.

Specifically, the client device receives such an address of a mobile switching center following the sending, by the client device to the access network mobility management device, of a request to associate with the access network operating in packet mode.

The various embodiments or features mentioned hereinafter may be added, independently or in combination with one another, to the features of the sending method defined above.

According to one particular embodiment of the invention, when the client device is connected to a communication network termed a visited network, the visited network being a communication network different from a network of the operator to which the client device subscribes, the signaling message is sent to said mobile switching center. When the client device is connected to a communication network termed a nominal network, the nominal network being a network of the operator to which the client device subscribes, the signaling message is sent by the client device to said proxy server of the subsystem of the communication network.

According to this particular embodiment of the invention, the sending method is implemented when the client device is in a roaming out situation, that is to say when the client device is connected to a communication network different from its nominal network (also called home network by those skilled in the art).

Correspondingly, the invention relates to a device designed to implement the method for sending a signaling message according to one particular embodiment of the invention, and also to a terminal comprising such a device.

The invention also relates to a method for associating a client device with an access network operating in packet mode, in order to access a communication network, comprising:
- a step of reception, by an access network mobility management device, of a request to associate with said access network, from the client device,
- following a step of authentication of the client device by the mobility management device, a step of sending, to said client device, an address based on the Internet protocol IP and assigned to said client device and an address of a mobile switching center of the communication network designed to receive, from the client device, at least one signaling message relating to a communication service provided to said client device by the communication network.

According to the invention, the client device acquires an address of a mobile switching center designed to process the signaling messages relating to the client device. Such an address of a mobile switching center is received from an access network mobility management device, such as an MME (Mobile Management Entity in English) server of an EPC (Evolved Packet Core in English) access network. Such a mobile switching center address has been acquired by the access network mobility management device from a PGW gateway of the EPC access network. Such a PGW gateway is known for assigning an IP address to a client device when the client device associates with the access network.

Correspondingly, the invention relates to a device for associating a client device with an access network operating in packet mode, in order to access a communication network, comprising:
- a module for receiving a request to associate with said access network, from the client device,
- a processing module able to authenticate the client device,
- a sending module able to send, to said client device, an address based on the Internet protocol IP and assigned to said client device and an address of a mobile switching center of the communication network designed to receive, from the client device, at least one signaling message relating to a communication service provided to said client device by the communication network.

Such a device is also designed to communicate with a PGW gateway of the access network in order to acquire the address of the mobile switching center.

The invention also relates to an appliance comprising such a device.

The various embodiments or features mentioned hereinafter may be added, independently or in combination with one another, to the features of the association method and of the association device defined above.

According to one particular embodiment of the invention, the address of the mobile switching center is sent to the client device in the case where the client device is connected to a communication network termed a visited network, the visited network being a communication network different from a network of the operator to which the client device subscribes.

According to another particular embodiment of the invention, the address of the mobile switching center is sent to the client device in the case where the mobility management device receives, from a client database of a communication network termed a nominal network, an item of information indicating that the nominal network is not suitable for managing a situation of handing over the connection of the client device from an access network operating in packet mode to an access network operating in circuit mode, or vice versa, the nominal network being a communication network of the operator to which the client device subscribes. Such a connection handover may occur when the client device is in the course of communicating with another client device, or outside of any communication.

According to this particular embodiment of the invention, the mobility management device sends the address of the mobile switching center only when the client device is in a roaming out situation and when the nominal network of the client device is not designed to support SRVCC or R-SRVCC (reverse functionality of the SRVCC functionality) functionality.

According to another particular embodiment of the invention, the signaling message is a message in accordance with the SIP protocol, included in the following list:

a message REGISTER to register the client device, a communication request message INVITE sent by the client device to another terminal, a message SUBSCRIBE to subscribe to an events notification service, sent by the client device to a server, a state publication message PUBLISH sent by the client device to a server, a message sending message MESSAGE sent by the client device to another terminal or server, a provisional response acknowledgement message PRACK sent by the client device to another terminal or server, an active session transfer message REFER sent by the client device to another terminal or server, an information message INFO sent by the client device to another terminal or server, a message BYE requesting the termination of a set-up session, sent by the client device to another terminal or server, a message CANCEL requesting the cancellation of a session undergoing setup, sent by the client device to another terminal or server, a message UPDATE requesting the renegotiation of a session that has not yet been set up, sent by the client device to another terminal or server, a message OPTIONS for exchanging communication capabilities, sent by the client device to another terminal.

In one particular embodiment of the invention, the various steps of the processing method, of the sending method and of the association method are implemented by computer program instructions.

The invention therefore also targets computer programs on an information medium, these programs being capable of being implemented respectively in a terminal or, more generally, in a computer, these programs respectively including instructions that are designed to implement the various steps of the methods that have just been described.

These programs may use any programming language, and be in the form of source code, object code, or of intermediate code between source code and object code, such as in a partially compiled form, or in any other desirable form.

The invention also targets a computer-readable information medium including computer program instructions, such as mentioned above.

The information medium may be any entity or device capable of storing the program. For example, the medium may include a storage means, such as a ROM, for example a CD ROM or a microelectronic circuit ROM, or else a magnetic or electronic recording means, for example a USB key or a hard disk.

Moreover, the information medium may be a transmissible medium such as an electrical or optical signal, which may be routed via an electrical or optical cable, by radio or by other means. The program according to the invention may in particular be downloaded from a network of Internet type.

Alternatively, the information medium may be an integrated circuit in which the program is incorporated, the circuit being designed to execute or to be used in the execution of the methods in question.

BRIEF DESCRIPTION OF THE DRAWINGS

Other advantages and features of the invention will be more clearly apparent on reading the following description of one particular embodiment of the invention, given by way of simple illustrative and nonlimiting example, and of the appended drawings, among which.

DETAILED DESCRIPTION OF ILLUSTRATIVE EMBODIMENTS

Figure 1A:
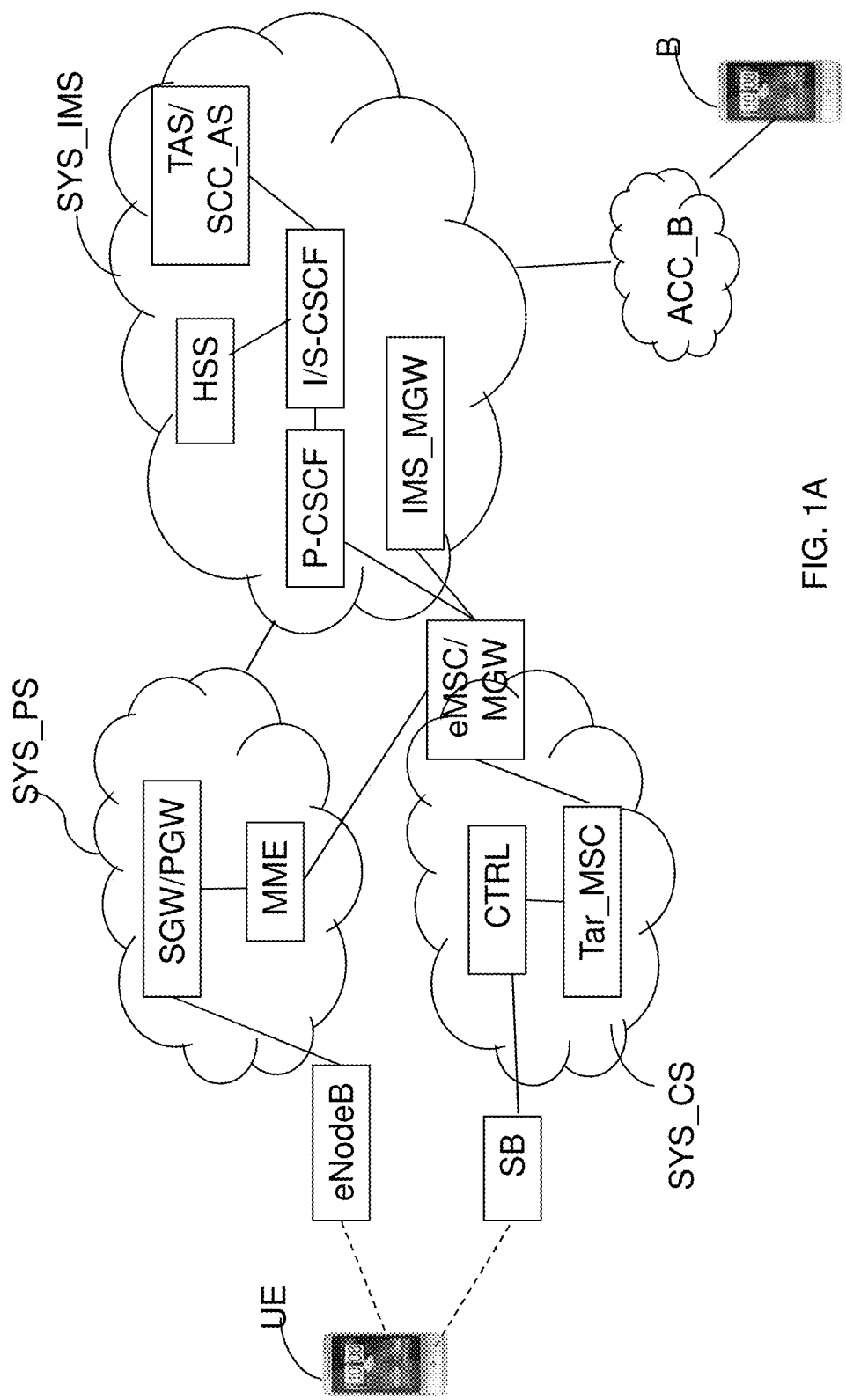
FIG. 1A shows an environment for implementing the invention according to one particular embodiment of the invention.

The environment illustrated in FIG. 1A comprises:
- a client device UE designed to set up communications with other client devices via a network operating in packet mode, or a network operating in circuit mode. For example, such a client device is a terminal of mobile telephone, smartphone, etc., type.
- an access network SYS_CS operating in circuit mode, for example of 2G or 3G type. The access network SYS_CS is for example in compliant with the GSM standard in the case of a 2G network, or the UMTS standard in the case of a 3G network. Such an access network SYS_CS conventionally comprises at least:
  - a base station SB with which the client device UE communicates in order to have access to a communication service via the access network SYS_CS; such a base station is of BTS (Base Transceiver Station) type in the case of a 2G access network (GSM for Global System for Mobile communications) or of NodeB type in the case of a 3G access network,
  - a control device CTRL of BSC or RNC type, depending on whether the access network SYS_CS is a 3G or 2G network. Such a control device CTRL controls the radio transmission of the BTS or NodeB base stations. It manages the allocation of radio resources, the ciphering of data before sending same to the client device UE, and the location of the client device.
  - a mobile switching center Tar_MSC interfaced with the control device CTRL,
  - an evolved mobile switching center eMSC associated with a media gateway MGW. Such a mobile switching center eMSC makes it possible to interface the access network operating in circuit mode with an IMS subsystem SYS_IMS of a communication network operator. The switching center eMSC ensures the translation of the signaling messages of the communication service of the operator between the SIP protocol of the subsystem SYS_IMS and the ISUP protocol (ISDN Signaling User Part, ISDN for Integrated Services Digital Network) of the access network SYS_CS, and vice versa. The gateway MGW associated with the switching center eMSC ensures the encapsulation and de-encapsulation, in accordance with the RTP protocol, of the circuit media data streams (GSM, AMR, AMR-WB codec, etc.) transmitted or received when a communication is set up by the client device UE with another client device or a server.
- an access network SYS_PS operating in packet mode, in accordance for example with the LTE standard defined by the 3GPP consortium. Such an access network SYS_PS conventionally comprises at least:
  - a base station eNodeB performing the role of a gateway between the client device UE connected to such a base station and the mobile network core, of EPC (Evolved Packet Core) type, of the access network SYS_PS,
  - a device MME for managing the mobility of the client device UE. The device MME in particular manages the authentication of the client device UE and the procedure of associating the client device UE with the access network SYS_PS. The device MME also manages the mobility of the client device UE.
  - gateways SGW and PGW (Serving Gateway and PDN Gateway in English). Such gateways make it possible to anchor the application streams (media streams and/or signaling streams) on the gateway SGW, on the one hand, and to access external data networks such as the Internet or an IMS subsystem on the gateway PGW, on the other hand.
- a subsystem SYS_IMS enabling the operator of the client device UE to provide a communication service, such as a voice over IP service. The subsystem SYS_IMS is based on an IMS architecture and conventionally comprises at least:
  - a server P-CSCF, which may incorporate an ATCF (Access Control Transfer Function) functionality used by the eSRVCC mechanism; such a functionality makes it possible to manage the handover of the client device UE from a 4G access network to a 3G or 2G access network, or vice versa, in the course of communication. During such a handover, such a functionality makes it possible to limit the call cutoff to a value of less than 300 ms, in particular when a client device is in a roaming out situation. ATCF functionality also makes it possible to manage a media device ATGW integrated into a media gateway of MGW (Media Gateway) type, IMS_MGW in FIG. 1. The media device ATGW anchors the RTP media streams of a communication session, making it possible to optimize the resources of the communication network when the communication session is handed over in the case of a 4G to 3G/2G handover, or vice versa.
  - a server I/S-CSCF,
  - a client database HSS,
  - application servers TAS (Telephony Application Server) and SCC-AS (Service Centralization and Continuity Application Server). The application server TAS is responsible for triggering the Originating (outgoing) and Terminating (incoming) services of a client device UE when a communication is transmitted or received from or to the client device UE. The application server SCC_AS firstly makes it possible to route an incoming communication to the client device UE by determining in particular whether the client device UE is connected to an access network operating in packet mode or operating in circuit mode. The application server SCC_AS secondly makes it possible to manage the handover of the client device from a 4G access network to a 3G or 2G access network, and vice versa, via SRVCC functionality.

The subsystem SYS_IMS is interconnected with the access network SYS_CS via a controller MGCF (Media Gateway Controller Function, not shown in the figure) of the gateway MGW (IMS_MGW in FIG. 1).

The subsystem SYS_IMS is also interconnected with the access network SYS_PS. In FIG. 1A, the access networks SYS_PS, SYS_CS and the subsystem SYS_IMS form a communication network of a communication network operator HOM to which the user of the client device UE subscribes.

The subsystem SYS_IMS may also be interconnected with other IMS subsystems of other operators (not shown) and/or other access networks.

The environment of FIG. 1A also comprises a client device B, such as a mobile terminal, with which the client device UE is able to communicate. The client device B is connected to an access network ACC_B. Such an access network is interconnected with the subsystem SYS_IMS via an interconnection point (not shown). The access network ACC_B may or may not be unfurled by the operator HOM.

Figure 1B:
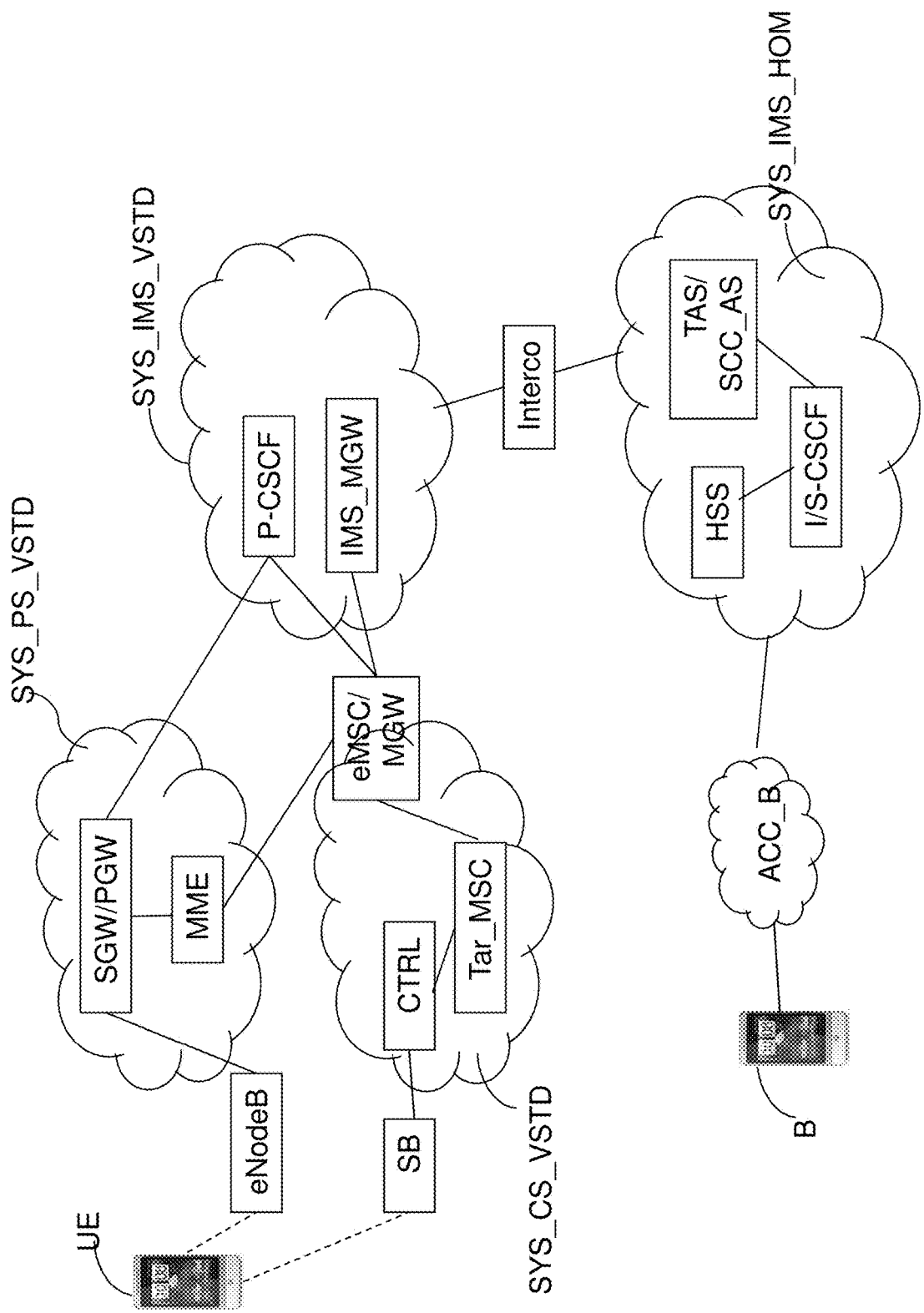
FIG. 1B shows an environment for implementing the invention according to another particular embodiment of the invention.

FIG. 1B describes an environment for implementing the invention according to another particular embodiment of the invention.

The environment illustrated by FIG. 1B differs from the environment illustrated in FIG. 1A in that the client device UE is connected to a communication network termed a visited network. Such a visited network is a communication network of a communication network operator VSTD different from the operator HOM to which the user of the client device UE subscribes. The communication network of the operator to which the user of the client device UE subscribes is termed nominal network or home network. When a client device UE is connected to a visited communication network, the client device UE is said to be in a roaming or roaming out situation. In the environment of FIG. 1B, the access network operating in packet mode SYS_PS and the access network operating in circuit mode SYS_CS of FIG. 1A are visited access networks SYS_PS_VSTD and SYS_CS_VSTD, respectively, comprising devices similar to those described in relation to FIG. 1A.

The environment of FIG. 1B also comprises:
a visited IMS subsystem (SYS_IMS_VSTD) of an operator of the visited access networks SYS_PS_VSTD and SYS_CS_VSTD; such a subsystem comprises at least one server P-CSCF and a media gateway IMS_MGW similar to those described in relation to FIG. 1,
an IMS subsystem (SYS_IMS_HOM) of the operator to which the user of the client device UE subscribes. Such a subsystem comprises at least one server I/S-CSCF, a client database HSS and application servers TAS and SCC_AS, similar to those described in relation to FIG. 1.

The access networks SYS_PS_VSTD, SYS_CS_VSTD and the subsystem SYS_IMS_VSTD form a communication network of the operator VSTD.

FIG. 1B illustrates a mode of operation involving the interconnection of the visited communication network and of the nominal communication network. The visited subsystem SYS_IMS_VSTD and the nominal subsystem SYS_IMS_HOM are interconnected via interconnection servers Interco, not detailed here. According to the particular embodiment of the invention described here, the two subsystems are interconnected in accordance with a model termed 'Local Breakout'. With such an interconnection mechanism, when the client device UE connected to a 4G access network wishes to access its communication services, the client device UE connects to an access point eNodeB of the access network SYS_PS_VSTD; it associates itself with such a network via an association procedure known to those skilled in the art and implemented by the devices MME and SGW/PGW of the network SYS_PS_VSTD. The client device UE then registers with the nominal subsystem SYS_IMS_HOM via the server P_CSCF of the visited subsystem SYS_IMS_VSTD, then the server I/S_CSCF of the nominal subsystem SYS_IMS_HOM.

Figure 2:
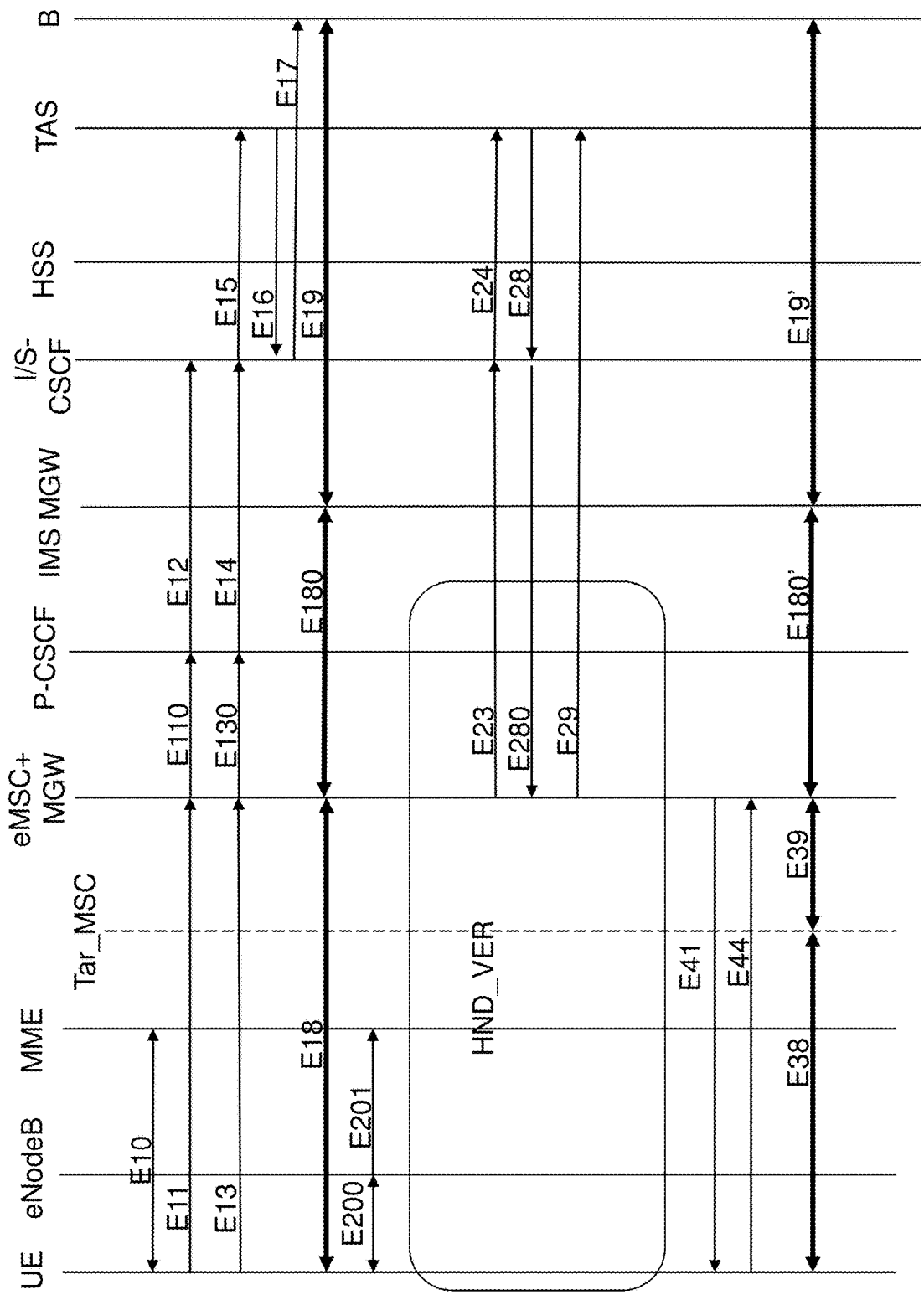
FIG. 2 shows steps of the methods for processing a signaling message, for sending a signaling message and for associating a client device with an access network according to one particular embodiment of the invention.

FIG. 2 shows steps of the methods for processing a signaling message, for sending a signaling message and for associating a client device with an access network according to one particular embodiment of the invention. The steps of the methods cited previously are described here in relation to the environment of FIG. 1A.

During a step E10, the user device UE associates itself with the access network SYS_PS by communicating with the device MME. During the association procedure, the device MME acquires, from the database HSS, the profile of the user of the client device UE and in particular two useful identifiers in the case of a handover:
an identifier STN-SR (Session Transfer Number-Single Radio) identifying the address of the server SCC_AS and
an identifier C-MSISDN (Correlated MSISDN), making it possible to identify a SIP session of the client device UE.

According to the invention, the identifier STN-SR is for example set to NULL in order to indicate that a case of handover of the client device UE is not able to be processed by the server SCC_AS or that the subsystem SYS_IMS does not have such a server. During step E10, the device MME authenticates the client device UE on the basis of authentication data transmitted by the client device during its association request and of data received from the database HSS.

During step E10, when the device MME has authenticated the client device UE, the client device UE acquires an IP address that is assigned thereto by the server PGW. Such an IP address is sent to the client device UE by the device MME in accordance with the PCO (Parameters Configuration Option) protocol. According to the invention, during step E10, the client device UE also acquires, from the device MME, an IP address of a switching center eMSC. Such an address of a switching center eMSC is acquired by the device MME from the server PGW that assigns a switching center eMSC to the client device UE.

The client device UE will then subsequently transmit and receive the SIP signaling messages to the server P-CSCF by way of the switching center eMSC.

The IP address of the P-CSCF has been configured beforehand and stored in the switching center eMSC by the operator HOM of the communication network.

During a step E11, the client device UE registers with the subsystem SYS_IMS by sending a SIP message REGISTER to the switching center eMSC.

During a step E110, the switching center eMSC modifies the source address of the received SIP message REGISTER by replacing the address of the client device UE with the address of the switching center eMSC. The switching center eMSC then transmits, during step E110, the SIP message REGISTER to the server P_CSCF.

In a known manner, during a step E12, the server P_CSCF transmits the received registration message to the server I-CSCF, which processes same. The server I_CSCF interrogates the database HSS, which sends back to said server the address of the S_CSCF to be used for the registration of the client device UE (not shown in the figure for greater clarity). The registration message is then transmitted to the server S_CSCF, which authenticates the client device UE and applies the 'Third Party Registration' procedure to the server TAS, so as to inform the server TAS of the registration of the client device UE.

In response (not shown), the server I/S-CSCF and then the server P-CSCF send back, to the switching center eMSC, a SIP message 200 OK indicating that the client device UE has been registered. The switching center eMSC replaces, in a recipient address field, the address of the switching center eMSC with the address of the client device UE, and transmits the SIP response 200 OK to the client device UE.

The client device UE is thus associated with an access network PS and registered in the subsystem SYS_IMS. The client device UE is then able to transmit and receive VoIP communications via the access network PS and the subsystem SYS_IMS.

During a step E13, the client device UE sends a communication request to another client device B in the form of a SIP message INVITE. The communication request is transmitted from the client device UE to the switching center eMSC during step E13.

During a step E130, the switching center eMSC modifies the source address of the received SIP message INVITE by replacing the address of the client device UE with the address of the switching center eMSC. The switching center eMSC then transmits, during step E130, the SIP message INVITE to the server P_CSCF.

During a step E14, the SIP message INVITE is transmitted by the server P_CSCF to the server S_CSCF. During a step E15, the server S_CSCF transmits the SIP message INVITE to the server TAS in order to trigger the Originating services associated with the client device UE. During a step E16, the server TAS retransmits the SIP message INVITE to the server S_CSCF. During a step E17, the server S_CSCF transmits the SIP message INVITE to the other client device B.

The communication request is set up in a manner similar to the setup of a communication in accordance with the SIP protocol. According to the invention, the SIP signaling messages transit through the switching center eMSC. From the point of view of the subsystem SYS_IMS, the pair (eMSC, UE) is seen as a single client device UE.

Provisional response messages SIP 183 In Progress, SIP 180 Ringing, SIP 200 OK and acknowledgement messages ACK are not described here, for greater clarity. The invention such as described for the SIP message REGISTER and SIP message INVITE also applies to such messages, and also to any type of signaling message not cited here.

The communication request is set up between the client device UE and the client device B. The media streams of the communication are transmitted in accordance with the RTP protocol in a bidirectional manner:
  between the client device UE and the gateway MGW associated with the switching center eMSC (communication E18),
  between the gateway MGW associated with the switching center eMSC and the gateway IMS_MGW of the subsystem SYS_IMS (communication E180),
  between the gateway IMS_MGW of the subsystem SYS_IMS and the client device B (communication E19).
    Over the course of the communication, the switching center eMSC then performs the role of RTP/RTCP stream relay. The switching center eMSC replaces:
      in the source address field of a media data stream, the address of the client device UE with the address of the mobile switching center eMSC when the media data stream is received from the client device and destined for the other client device B,
      in the recipient address field of the media data stream, the address of the mobile switching center eMSC with the address of the client device UE when the media data stream is received from the other client device B and destined for the client device UE.

A description is given hereinafter, in relation to FIG. 2, of an example of a 4G to 3G/2G handover of the ongoing communication of the client device UE.

During a step E200, the client device UE continuously detects the various radio levels (4G, 3G, 2G) and then transmits them to the 4G antenna eNodeB.

As soon as the antenna eNodeB detects, during a step E201, that the 4G radio level is not sufficient to maintain the ongoing communication of the client device UE and that another 3G/2G radio has a level sufficient to maintain the ongoing communication of the client device UE, the antenna eNodeB requests, via a request in accordance with the Diameter protocol, for the device MME to activate a handover procedure.

The handover procedure, denoted HND_VER in FIG. 2, proceeds in a known manner. The switching center eMSC looks up the target switching center Tar_MSC with which the client device UE will have to be associated after the handover. A circuit call is set up from the switching center eMSC to the target MSC switching center Tar_MSC. The client device UE connects to a 2G or 3G antenna and switches to the switching center Tar_MSC by using a procedure in accordance with the CC (Call Control) standard.

Following the 4G to 3G/2G handover, the switching center eMSC, which was acting as a SIP and RTP/RTCP proxy, then changes role so as to act as gateway MGCF and MGW. The MGCF function of the switching center eMSC makes it possible to:
  translate the circuit signaling messages into SIP signaling messages, and vice versa,
  manage the gateway MGW such that the gateway MGW translates the circuit media streams into RTP/RTCP data streams, and vice versa.

Following the 4G to 3G/2G handover of the client device UE, during a step E41, the switching center eMSC ends the SIP communication session of the client device UE, since the ongoing communication of the client device UE has switched to circuit mode starting from this client device UE. During step E41, the switching center eMSC then sends a SIP message BYE to the client device UE via the access network PS. During a step E44, the client device UE acknowledges the end of the SIP session by sending a SIP message 200 OK to the switching center eMSC.

Following the 4G to 3G/2G handover, the media streams of the ongoing communication between the client device UE and the other client device B are transmitted in a bidirectional manner:
  in circuit technology, between the client device UE and the switching center Tar_MSC (communication E38),
  in circuit technology, between the switching center Tar_MSC and the gateway MGW associated with the switching center eMSC (communication E39),
  in accordance with the RTP protocol, between the gateway MGW associated with the switching center eMSC and the gateway IMS_MGW of the subsystem SYS_IMS (communication E180'),
  between the gateway IMS_MGW of the subsystem SYS_IMS and the client device B (communication E19').

It should be noted that only the devices of the access networks CS and PS have been impacted by the handover of the client device UE. By virtue of the invention, the subsystem SYS_IMS has not been impacted by the handover. The invention thus makes it possible to optimize the use of the resources of the subsystem SYS_IMS. In particular, the invention makes it possible to avoid the use of a server SCC_AS for managing the handover of the client device.

According to one particular embodiment of the invention, the switching center eMSC may initiate a renegotiation procedure as far as the server TAS, so as to inform such a server of the change in connectivity of the client device UE, for example for issues such as billing the user of the client device UE or of traceability. Specifically, such a server TAS may be responsible for providing billing information, such as call/connection records, to a billing server via the Diameter protocol or via the SFTP (Secure File Transfer Protocol) protocol if the server TAS generates records of CDR (Call Detail Record) type.

To this end, during a step E23, the switching center eMSC sends a SIP message re-INVITE or UPDATE to the server S-CSCF. Such a message is transmitted by the server S-CSCF to the server TAS during a step E24. The server TAS responds to the server S-CSCF during a step E28 by sending a SIP message 200 OK, which is retransmitted to the switching center eMSC during a step E280. During a step E29, the switching center eMSC acknowledges such a message by sending a SIP message ACK to the server TAS, via the server S-CSCF.

During such a renegotiation, the media streams are not impacted. In particular, there is no change of codecs. Only SIP signaling information is transmitted to the server TAS.

Figure 3:
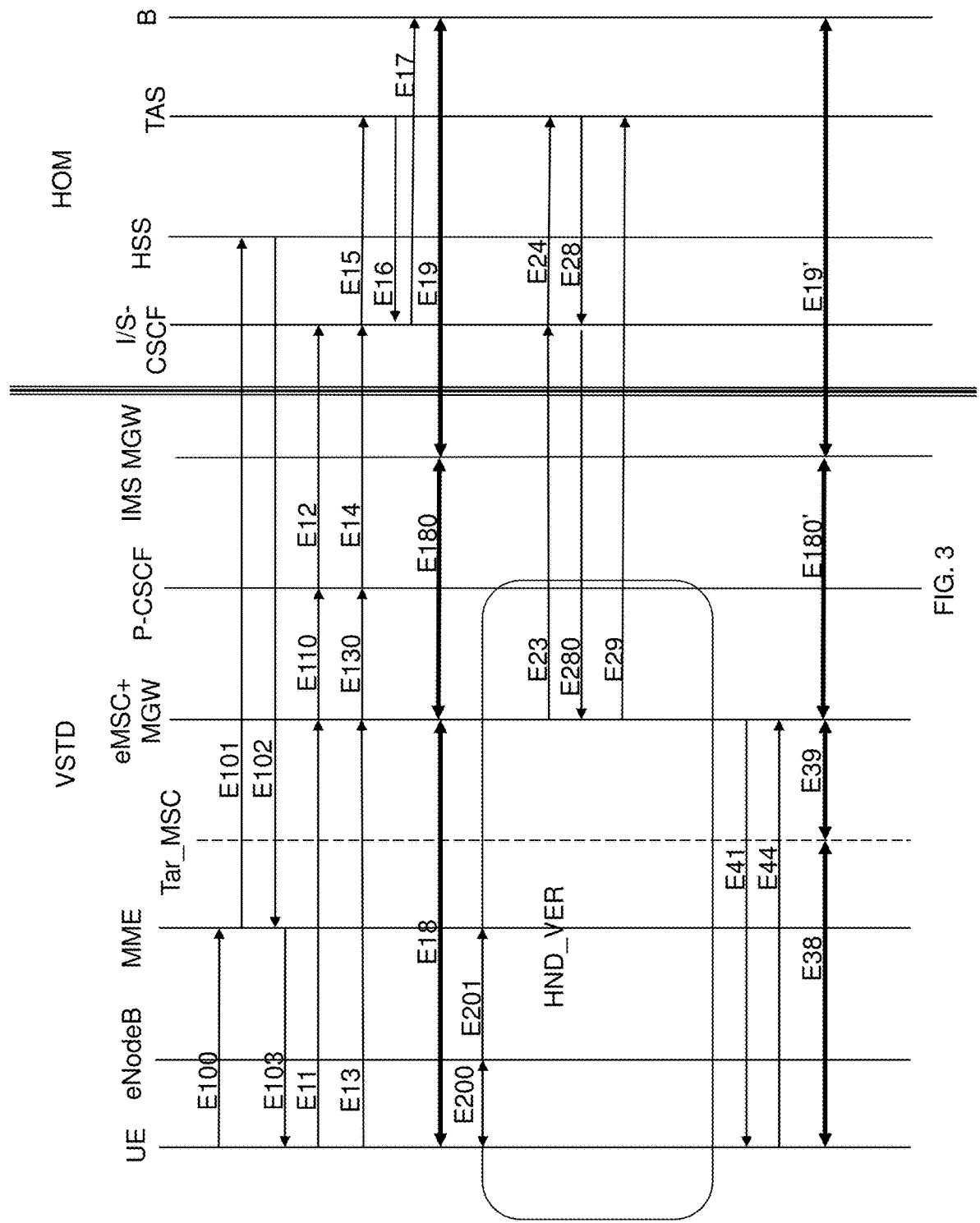
FIG. 3 shows steps of the methods for processing a signaling message, for sending a signaling message and for associating a client device with an access network according to another particular embodiment of the invention.

FIG. 3 shows steps of the methods for processing a signaling message, for sending a signaling message and for associating a client device with an access network according to another particular embodiment of the invention. The steps of the methods cited previously are described here in relation to the environment of FIG. 1B. According to this particular embodiment of the invention, the user of the client device UE subscribes to an operator of a communication network HOM and the client device UE is connected to a visited communication network VSTD.

During a step E100, the user device UE associates itself with the access network SYS _PS _VSTD by communicating with the device MME of such an access network.

During the association procedure, the device MME detects, over the course of a step E101, that the client device UE is in a roaming out (roaming) situation.

During the step E101, the device MME interrogates the database HSS of the nominal subsystem HOM in order to acquire the profile of the user of the client device UE.

During a step E102, the device MME acquires, from the database HSS, an item of information indicating that the nominal subsystem SYS_IMS_HOM does not have a server SCC_AS for managing handover situations, or does not wish for such a server to be used. For example, such an item of information is acquired by the device MME from the identifier STN-SR set to the value 'NULL'.

During a step E103, the client device UE acquires, from the device MME and via the PCO protocol:
the IP address that is assigned thereto by the server PGW and
the IP address of a switching center eMSC.

The client device UE will thus transmit and receive the SIP signaling messages to and from this switching center eMSC, rather than the server P-CSCF of the visited subsystem SYS-IMS_VSTD. The IP address of the P-CSCF has been configured beforehand and stored in the switching center eMSC by the operator VSTD. The remainder of the description of FIG. 3 is identical to the description of FIG. 2. The server P-CSCF corresponds to the server P-CSCF of the subsystem SYS_IMS_VSTD, and the servers I/S-CSCF correspond to the servers I/S-CSCF of the subsystem SYS_IMS_HOM.

Advantageously, when the client device UE is in a roaming out situation and when a 4G to 3G/2G or 3G/2G to 4G handover has to be implemented for this client device UE, the invention enables such a handover to be implemented solely at the level of the access network of the client device. According to the invention, such a handover thus does not involve the subsystem SYS_IMS_HOM.

Figure 4:
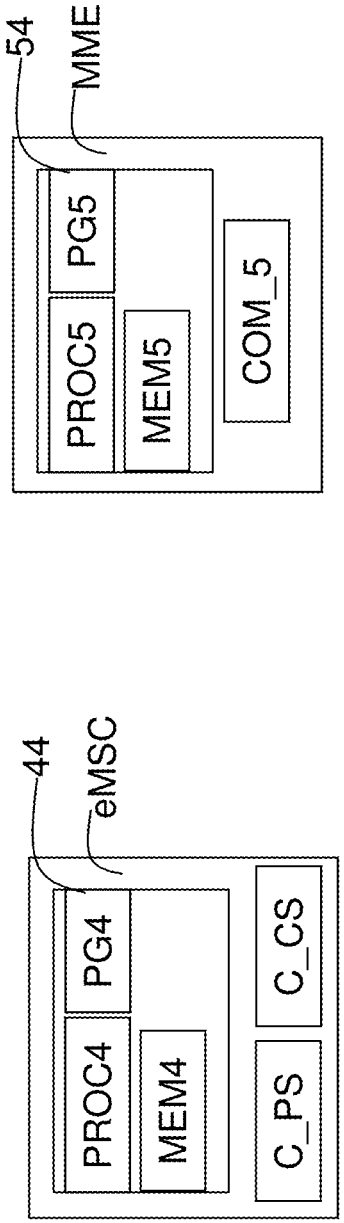
FIG. 4 illustrates a device for processing a signaling message according to one particular embodiment of the invention.

FIG. 4 illustrates a device eMSC for processing a signaling message according to one particular embodiment of the invention.

Such a device comprises a processing module 44, comprising in particular a storage module MEM4, for example a memory, and a processing unit PROC4, equipped for example with a microprocessor. The processing unit PROC4 is managed by a computer program PG4 implementing the method for processing a signaling message such as described in relation to FIG. 2 or 3.

On initialization, the code instructions of the computer program PG4 are for example loaded in memory MEM4 before being executed by the processor of the processing unit PROC4.

The processor of the processing unit PROC4 implements the steps of the method for processing a signaling message relating to a communication service provided to a client device UE by the communication network in accordance with the instructions of the computer program PG4.

The processor of the processing unit PROC4 in particular implements:
when the client device UE is connected to the communication network via an access network operating in circuit mode, a processing step for translating a first signaling message, designed to be routed via the access network operating in circuit mode, into a second signaling message designed to be routed via the access network operating in packet mode, and vice versa, when the client device is connected to the communication network via an access network operating in circuit mode,
when the client device UE is connected to the communication network via an access network operating in packet mode,
a step of receiving, from said client device or from a server of the communication network, a third signaling message designed to be routed via the access network operating in packet mode,
a step of replacing, in the received third signaling message, a source address comprising an address of the client device with an address of the mobile switching center,
a step of sending said modified third signaling message to the server of the communication network or to said client device.

The device eMSC comprises in particular a communication module C_PS designed to transmit and receive signaling messages and media streams to and from a network operating in packet mode.

The device eMSC also comprises a communication module C_CS designed to transmit and receive signaling messages and media streams to and from a network operating in circuit mode.

The device eMSC is for example included in an evolved mobile switching center.

Figure 5:
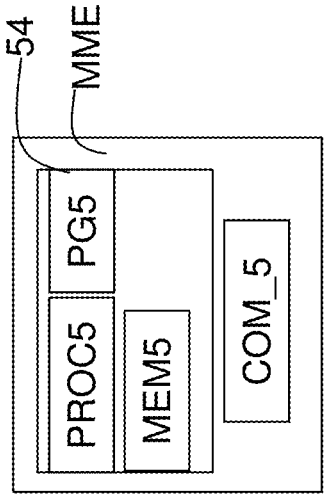
FIG. 5 illustrates a device for associating a client device with an access network according to one particular embodiment of the invention.

FIG. 5 illustrates a device MME for associating a client device UE with an access network according to one particular embodiment of the invention.

Such a device comprises a processing module 54, comprising in particular a storage module MEM5, for example a memory, and a processing unit PROC5, equipped for example with a microprocessor. The processing unit PROC5 is managed by a computer program PG5 implementing the method for associating a client device UE such as described in relation to FIG. 2 or 3.

On initialization, the code instructions of the computer program PG5 are for example loaded in memory MEM5 before being executed by the processor of the processing unit PROC5.

The processor of the processing unit PROC5 implements the steps of the method for associating a client device UE with an access network operating in packet mode, in order to access a communication network, in accordance with the instructions of the computer program PG5.

The processor of the processing unit PROC5 in particular implements:
- a step of receiving a request to associate with said access network, from the client device,
- following a step of authentication of the client device, a step of sending, to said client device, an address based on the Internet protocol IP and assigned to said client device and an address of a mobile switching center of the communication network designed to receive, from the client device, at least one signaling message relating to a communication service provided to said client device by the communication network. The device MME comprises in particular a communication module COM_5 designed to enable the device MME to communicate with other devices via a communication network operating in packet mode.

The device MME is for example included in a device MME for managing the mobility of an EPC network.

Figure 6:
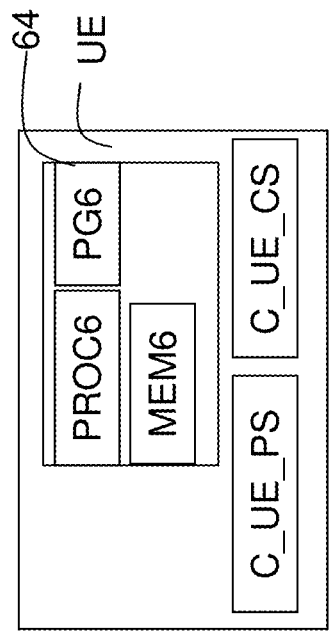
FIG. 6 illustrates a device for sending a signaling message according to one particular embodiment of the invention.

FIG. 6 illustrates a device UE for sending a signaling message according to one particular embodiment of the invention.

Such a device comprises a processing module 64, comprising in particular a storage module MEM6, for example a memory, and a processing unit PROC6, equipped for example with a microprocessor. The processing unit PROC6 is managed by a computer program PG6 implementing the method for sending a signaling message such as described in relation to FIG. 2 or 3.

On initialization, the code instructions of the computer program PG6 are for example loaded in memory MEM6 before being executed by the processor of the processing unit PROC6.

The processor of the processing unit PROC6 implements the steps of the method for sending a signaling message relating to a communication service provided to a client device UE by a communication network in accordance with the instructions of the computer program PG6.

The processor of the processing unit PROC6 in particular implements, when said signaling message is designed to be routed via an access network operating in packet mode, and when said signaling message is destined for a proxy server of a subsystem of the communication network:
- during a phase of associating the client device with said access network operating in packet mode in order to access said communication network, a step of acquiring an address of a mobile switching center of the communication network, from an access network mobility management device,
- after the phase of associating the client device with said access network, a step of sending the signaling message to said mobile switching center.

The device UE comprises in particular a communication module C_UE PS designed to transmit and receive signaling messages and media streams to and from a network operating in packet mode.

The device UE also comprises a communication module C_UE CS designed to transmit and receive signaling messages and media streams to and from a network operating in circuit mode.

The device UE is for example included in a terminal. Such a terminal may be a mobile telephone, a tablet or a computer equipped with a key for connecting to a mobile communication network. More generally, the device UE may be any connected terminal or object designed to communicate via a mobile communication network. An exemplary embodiment of the invention provides improvements with respect to the prior art.

The invention claimed is:

1. A method, implemented in a communication network comprising a mobile switching center, for processing signaling messages relating to a communication service provided to a client device by the communication network, the method comprising:
  performing the following acts by the mobile switching center in response to the client device being connected to the communication network via an access network operating in circuit mode:
    translating a first signaling message, designed to be routed via the access network operating in circuit mode, into a second signaling message designed to be routed via an access network operating in packet mode, and vice versa, and
  performing the following acts by the mobile switching center in response to the client device being connected to the communication network via an access network operating in packet mode:
    receiving from said client device a third signaling message designed to be routed via the access network operating in packet mode,
    replacing in a source address field of the received third signaling message, an address of the client device with an address of the mobile switching center to produce a modified third signaling message,
    sending said modified third signaling message to a server of the communication network,
    receiving from the server of the communication network a fourth signaling message designed to be routed via the access network operating in packet mode,
    replacing in a recipient address field of the received fourth signaling message, the address of the mobile switching center with the address of the client device to produce a modified fourth signaling message, and
    sending said modified fourth signaling message to said client device.

2. The method as claimed in claim 1, the method further comprising:
  during a phase of associating the client device with said access network operating in packet mode in order to access said communication network, the client device acquiring the address of the mobile switching center of the communication network, from an access network mobility management device.

3. The method as claimed in claim 1, further comprising, during the phase of associating the client device with the access network operating in packet mode:
  receiving, by the access network mobility management device, a request to associate with said access network, from the client device,
  following authentication of the client device by the mobility management device, the access network mobility management device sending, to said client device, an address based on the Internet protocol IP and assigned to said client device and the address of the mobile switching center of the communication network designed to receive, from the client device, at least one signaling message relating to the communication service provided to said client device by the communication network.

4. The method as claimed in claim 3, wherein the address of the mobile switching center is sent to the client device in the case where the client device is connected to a communication network termed a visited network, the visited network being a communication network different from a network of the operator to which the client device subscribes.

5. The method as claimed in claim 4, wherein the address of the mobile switching center is sent to the client device in the case where the mobility management device receives, from a client database of a communication network termed a nominal network, an item of information indicating that the nominal network is not suitable for managing a situation of handing over the connection of the client device from an access network operating in packet mode to an access network operating in circuit mode, or vice versa, the nominal network being a communication network of the operator to which the client device subscribes.

6. The method as claimed in claim 1, wherein the first and third and fourth signaling messages are messages in accordance with the SIP protocol, included in the following list:
   a message REGISTER to register the client device,
   a communication request message INVITE sent by the client device to another terminal,
   a message SUBSCRIBE to subscribe to an events notification service, sent by the client device to a server,
   a state publication message PUBLISH sent by the client device to a server,
   a message MESSAGE sent by the client device to another terminal or server,
   a message for exchanging communication capabilities, sent by the client device to another terminal.

7. A processing device for processing a signaling message relating to a communication service provided to a client device by a communication network, said device comprising:
   a processor; and
   a non-transitory computer-readable medium comprising instructions stored thereon, which when executed by the processor configure the processing device to:
   in response to the client device is-being connected to the communication network via an access network operating in circuit mode:
      translate a first signaling message, designed to be routed via the access network operating in circuit mode, into a second signaling message designed to be routed via an access network operating in packet mode, and vice versa,
   in response to the client device being connected to the communication network via an access network operating in packet mode:
      receive from said client device a third signaling message designed to be routed via the access network operating in packet mode,
      replace in a source address field of the received third signaling message, an address of the client device with an address of the processing device to produce a modified third signaling message,
      send said modified third signaling message to the server of the communication network,
      receive from the server of the communication network a fourth signaling message designed to be routed via the access network operating in packet mode,
      replace in a recipient address field of the received fourth signaling message, the address of the processing device with the address of the client device to produce a modified fourth signaling message, and
      send said modified fourth signaling message to said client device.

8. The processing device as claimed in claim 7, wherein the instructions further configure the processing device to:
   receive and transmit a media data stream relating to a communication set up between said client device and another client device,
   replace, in a source address field of the media data stream, the address of the client device with the address of the processing device when the media data stream is received from the client device and destined for the other client device,
   replace, in a recipient address field of the media data stream, the address of the processing device with the address of the client device when the media data stream is received from the other client device and destined for the client device.

9. The processing device as claimed in claim 7, furthermore comprising a memory storing an address of a proxy server of the subsystem of the communication network.

10. A mobile switching center comprising the processing device as claimed in claim 7.

11. A system comprising:
   a processing device for processing a signaling message relating to a communication service provided to a client device by a communication network, said processing device comprising:
   a first processor; and
   a first non-transitory computer-readable medium comprising instructions stored thereon, which when executed by the first processor configure the processing device to:
   in response to the client device being connected to the communication network via an access network operating in circuit mode:
      translate a first signaling message, designed to be routed via the access network operating in circuit mode, into a second signaling message designed to be routed via an access network operating in packet mode, and vice versa,
   in response to the client device being connected to the communication network via an access network operating in packet mode:
      receive from said client device a third signaling message designed to be routed via the access network operating in packet mode,
      replace in a source address field of the received third signaling message, an address of the client device with an address of the processing device to produce a modified third signaling message,
      send said modified third signaling message to the server of the communication network,
      receive from the server of the communication network a fourth signaling message designed to be routed via the access network operating in packet mode,
      replace in a recipient address field of the received fourth signaling message, the address of the processing device with the address of the client device to produce a modified fourth signaling message, and send said modified fourth signaling message to said client device; and the client device, which comprises:

a second processor; and a second non-transitory computer-readable medium comprising instructions stored thereon, which when executed by the second processor configure the client device to:

acquire the address of the processing device, from an access network mobility management device, during a phase of associating the client device with the access network operating in packet mode in order to access said communication network.

12. The system as claimed in claim 11, wherein the first and third signaling messages are messages in accordance with the SIP protocol, included in the following list:

a message REGISTER to register the client device, a communication request message INVITE sent by the client device to another terminal, a message SUBSCRIBE to subscribe to an events notification service, sent by the client device to a server, a state publication message PUBLISH sent by the client device to a server, a message MESSAGE sent by the client device to another terminal or server, a message for exchanging communication capabilities, sent by the client device to another terminal.

13. The system as claimed in claim 11, further comprising:

an associating device for associating the client device with the access network operating in packet mode, in order to access the communication network, the associating device comprising:

a third processor; and a third non-transitory computer-readable medium comprising instructions stored thereon, which when executed by the processor configure the associating device to:

receive a request to associate with said access network operating in packet mode, from the client device, authenticate the client device, send, to said client device, an address based on the Internet protocol IP and assigned to said client device and the address of the processing device of the communication network designed to receive, from the client device, at least one signaling message relating to the communication service provided to said client device by the communication network.

* * * * *

UNITED STATES PATENT AND TRADEMARK OFFICE
CERTIFICATE OF CORRECTION

PATENT NO. : 10,863,342 B2  
APPLICATION NO. : 15/576544  
DATED : December 8, 2020  
INVENTOR(S) : Bertrand Bouvet Page 1 of 1

It is certified that error appears in the above-identified patent and that said Letters Patent is hereby corrected as shown below:

In the Claims

In Claim 6, Column 19, Line 26:  
Please delete "first and" and insert --first,--.

In Claim 7, Column 19, Line 48:  
Please delete "is-being" and insert --being--.

Signed and Sealed this  
Twenty-second Day of February, 2022

Drew Hirshfeld  
*Performing the Functions and Duties of the*  
*Under Secretary of Commerce for Intellectual Property and*  
*Director of the United States Patent and Trademark Office*